United States Patent [19]
Mizuta

[11] 4,361,838
[45] Nov. 30, 1982

[54] REMOTE METER READING ARRANGEMENT

[75] Inventor: Toshiaki Mizuta, Kawasaki, Japan

[73] Assignee: Ricoh Co., Ltd., Tokyo, Japan

[21] Appl. No.: 60,461

[22] Filed: Jul. 25, 1979

[30] Foreign Application Priority Data

Jul. 29, 1978 [JP] Japan .................................. 53-93004
Aug. 26, 1978 [JP] Japan .................................. 53-103379
Sep. 25, 1978 [JP] Japan .................................. 53-116492

[51] Int. Cl.³ ...................... G08C 19/00; G08C 19/16
[52] U.S. Cl. ........................ 340/870.02; 340/870.19; 340/870.14
[58] Field of Search ................... 340/870.02, 870.03, 340/870.14, 870.39, 870.19, 150, 151, 310 A, 870.01; 179/2 AM

[56] References Cited
U.S. PATENT DOCUMENTS

| | | | |
|---|---|---|---|
| 2,689,950 | 9/1954 | Bayliss et al. | 340/870.14 |
| 2,799,727 | 7/1957 | Segerstrom | 340/870.14 |
| 2,845,613 | 7/1958 | Pawley | 340/870.14 |
| 3,313,160 | 4/1967 | Goldman | 340/870.03 |
| 4,208,653 | 6/1980 | Abe | 340/870.39 |

*Primary Examiner*—James J. Groody
*Attorney, Agent, or Firm*—Burgess, Ryan and Wayne

[57] ABSTRACT

A remote meter reading arrangement in which power for the remote terminal is supplied from the data collection terminal by transmission lines. At the moment power is applied to the remote terminal, a clock pulse generator in the remote terminal is supplied with power and begins to generate clock pulses to a counter, which successively couples each stage of the meter to the data collection terminal so that pulses of greater or lesser amplitude are generated in sequence, corresponding to each significant digit of the remote meter, to indicate the meter reading.

5 Claims, 13 Drawing Figures

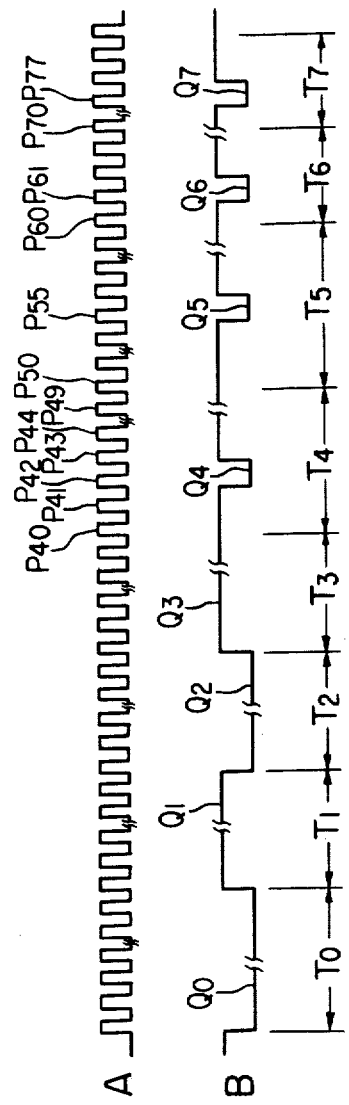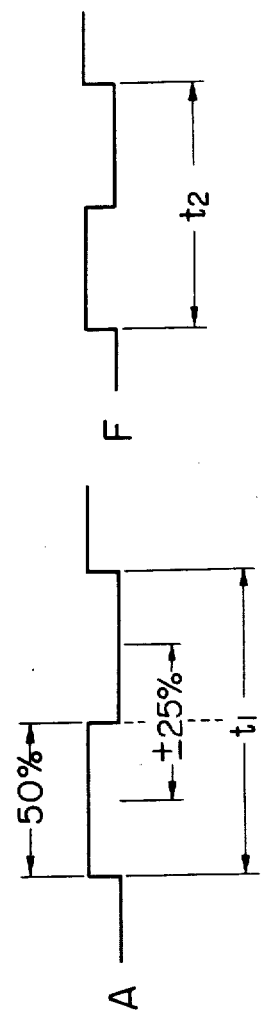

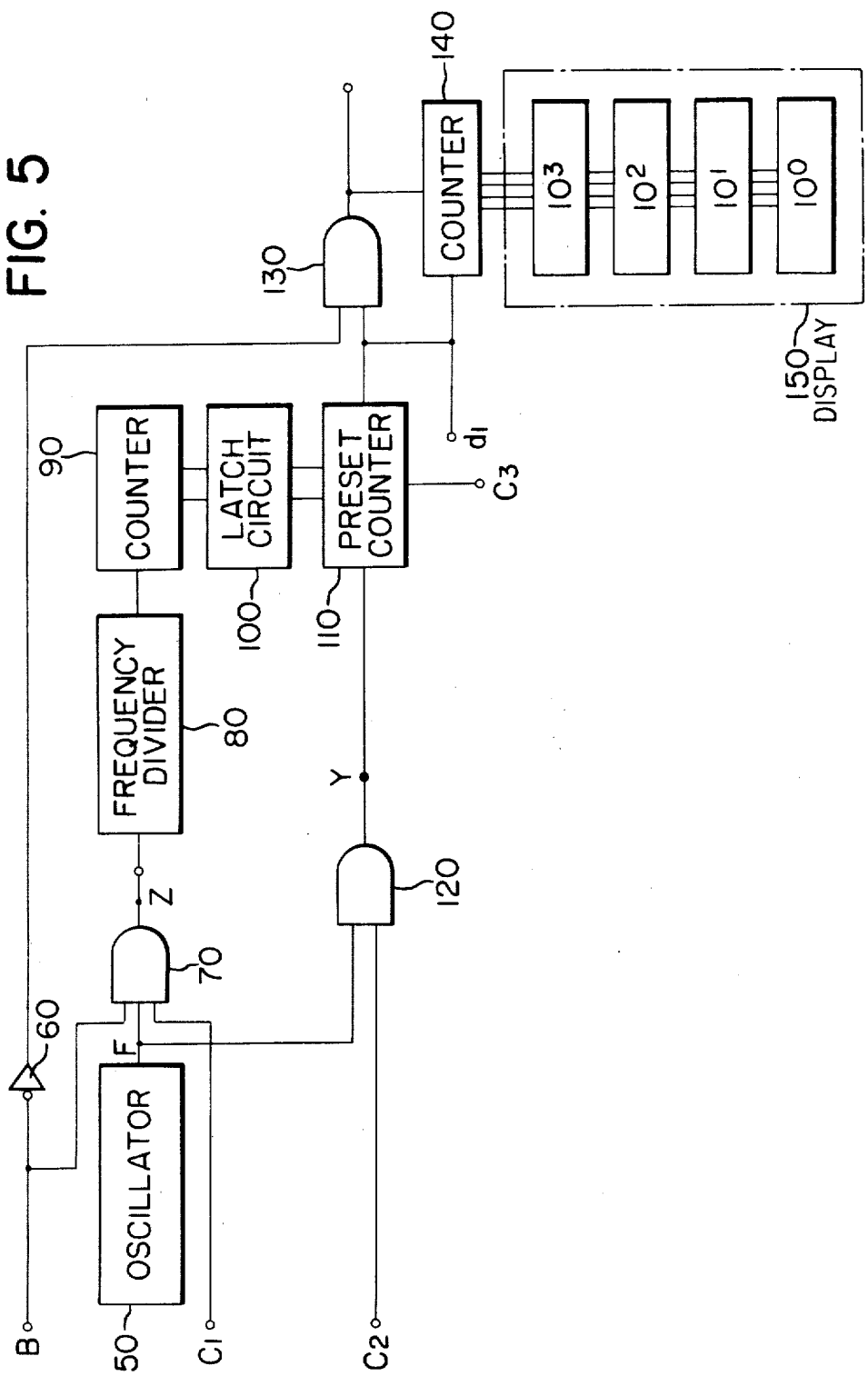

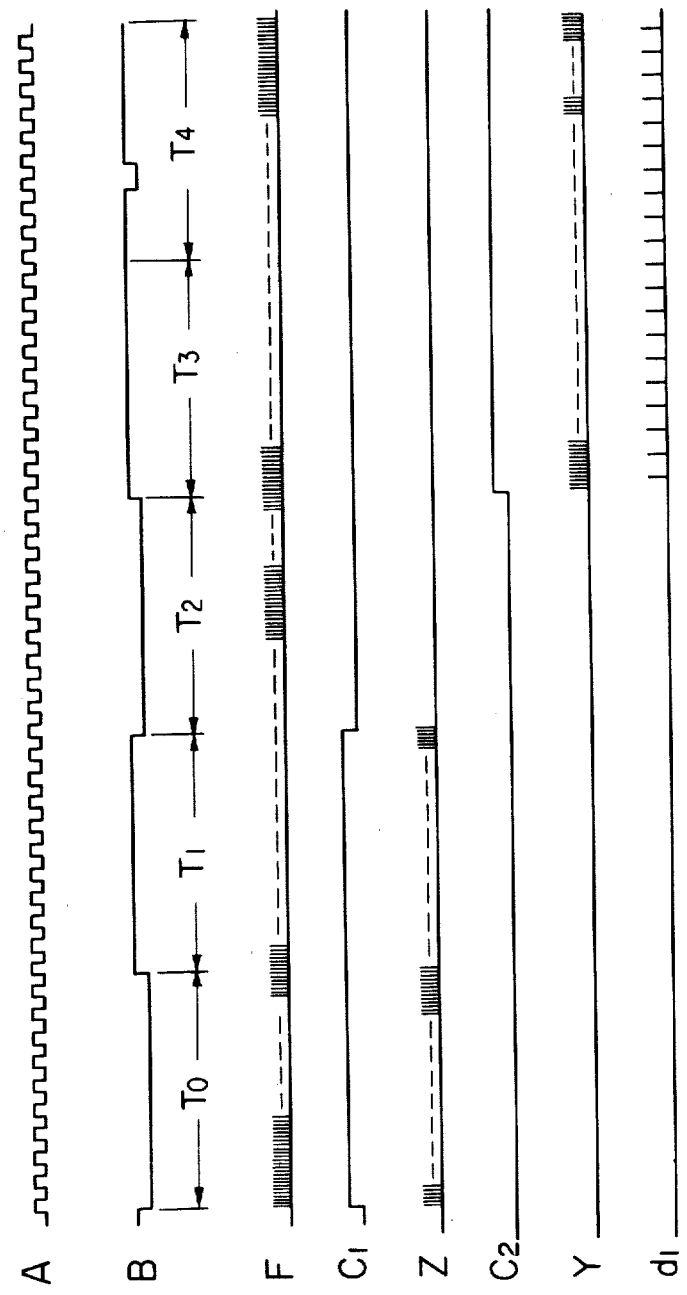

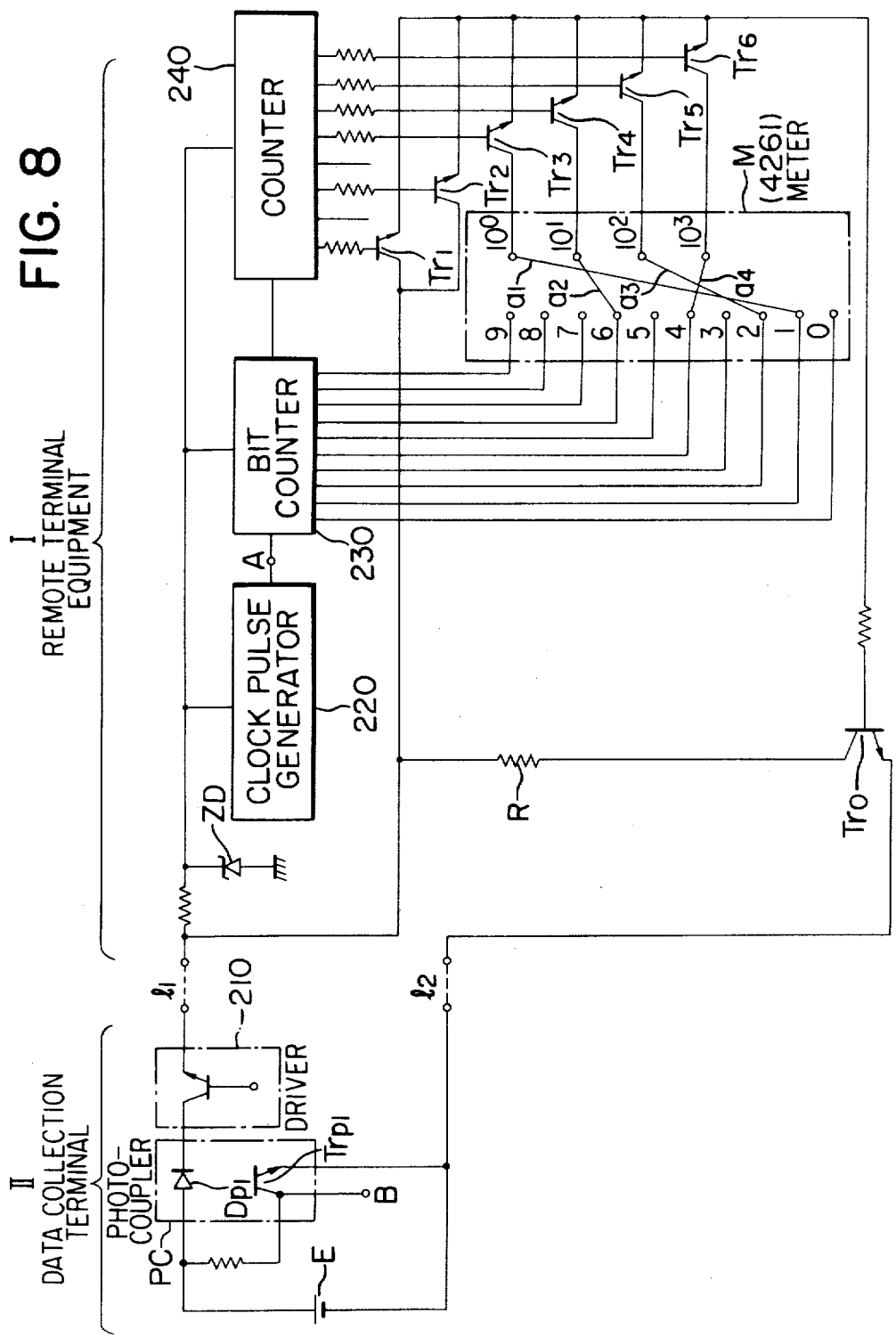

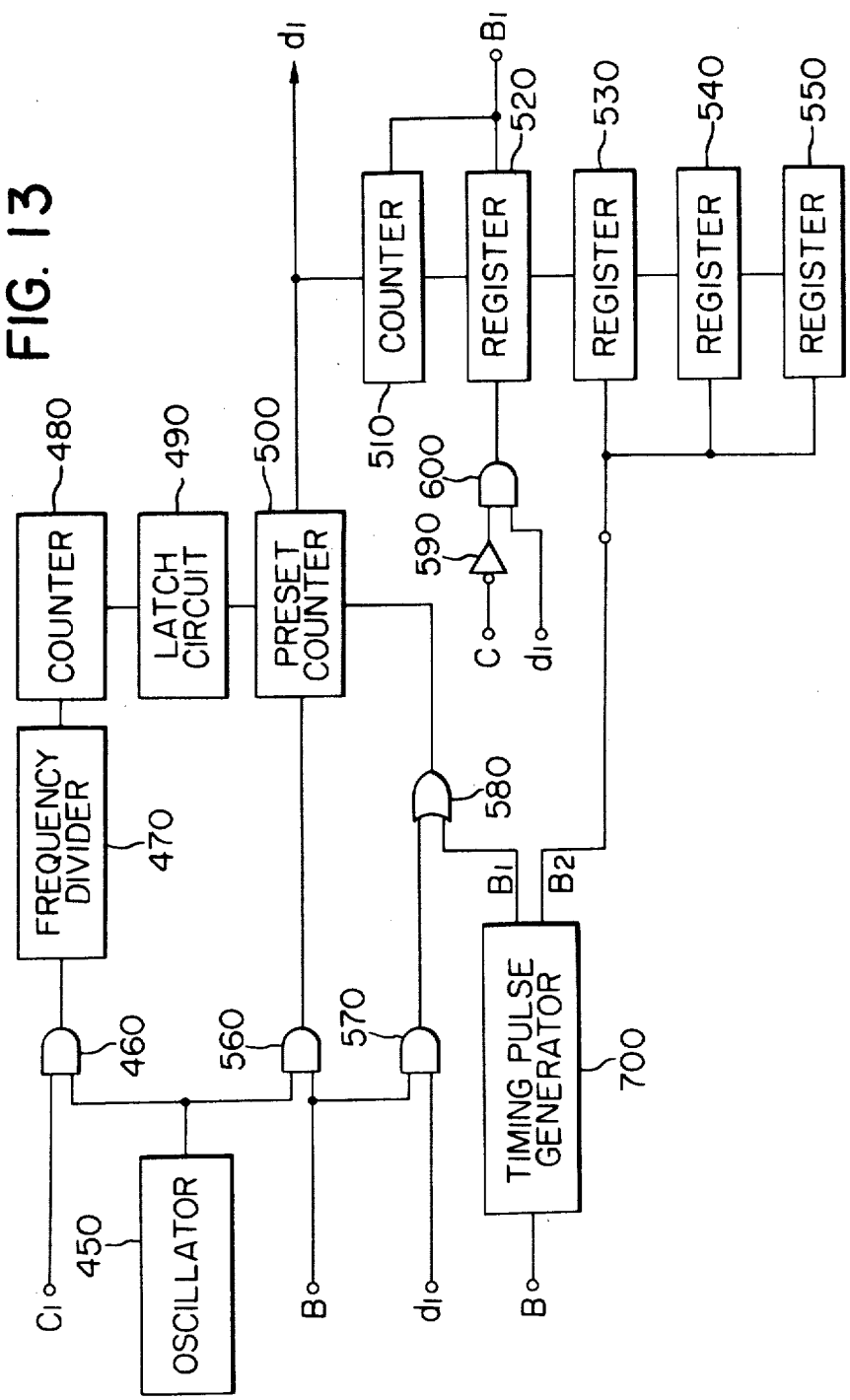

REMOTE METER READING ARRANGEMENT

BACKGROUND OF THE INVENTION

The present invention relates to a data collection system for collecting data such as the consumed quantity of electricity, water or gas from a remote terminal equipment.

There have been proposed various types of data collection system for collecting at a data collection terminal the data such as the reading of a watt-hour meter, water meter or gas meter installed in each home. For instance, there has been invented and demonstrated a data collection system wherein each remote terminal equipment has a battery power source and a clock pulse generator which is activated to generate the clock pulses when a remote terminal equipment is selected and in response to the clock pulses the data is transmitted to a data collection terminal. This system is expensive because each remote terminal equipment must be provided with a battery power source. Furthermore the voltage drop of the battery power source results in misreading and therefore the battery power source must be replaced. The data collection system of the type described is therefore not satisfactory in practice in view of accuracy in reading data and maintenance. Furthermore this data collection system has another disadvantage in that each remote terminal equipment must be provided with an oscillator capable of oscillating at a predetermined common frequency with a considerably higher degree of accuracy. This means that the costs of oscillators become high and that precise adjustment of an oscillating frequency is needed in the fabrication of remote terminal equipment. Moreover because of the aging, readjustment of an oscillating frequency is required.

In some data collection systems, the electric power is supplied from a data collection terminal to each remote terminal equipment so that the provision of a battery power source may be eliminated. However, the data collection terminal and the remote terminal equipment must be interconnected with transmission lines for transmitting the power. As a result, the installation costs increase and the installation becomes complicated.

There have proposed data collection systems wherein a data collection terminal transmits clock pulses to each remote terminal equipment so that the provision of a clock pulse generator in each remote terminal equipment may be eliminated. However, the amplitude of the clock pulses tends to change due to the electrical resistance of transmission lines interconnecting between the data collection terminal and each remote terminal equipment.

There have been further proposed data collection systems in which a data collection terminal supplies each remote terminal equipment with clock pulses, from which is derived a power voltage for operating a remote terminal equipment. Since the clock pulses act as a power signal or a data signal, the clock pulses become unstable, resulting in misreading.

SUMMARY OF THE INVENTION

Accordingly, one of the objects of the present invention is to provide a data collection system wherein each remote terminal equipment does not require a battery power source and a data collection terminal and each remote terminal equipment is interconnected with a minimum number of transmission lines so that the data in each remote terminal equipment may be collected at the data collection terminal.

A further object of the present invention is to provide a data collection system wherein component parts of remote terminal equipment may be selected from a wide variety of products and consequently the data collection system becomes inexpensive.

A still further object of the present invention is to provide a data collection system which may read and collect data at a fast speed with a higher degree of accuracy.

As herein described, there is provided a data collection system wherein each remote terminal equipment is provided with an oscillator or a clock pulse generator with a much relaxed oscillation frequency tolerance for generating the clock pulses in response to which the data may be read out, and a data collection terminal is provided with a means for generating the clock pulses based on the clock pulse delivered from each remote terminal equipment so that the data may be read into the data collection terminal from each remote terminal equipment.

A feature of the invention is a data collection system wherein remote terminal equipment does not need to be provided with oscillators or clock pulse generators capable of oscillating at a predetermined common oscillation frequency, so that high precision oscillators may not be needed, no oscillation frequency adjustment is needed and the aging of the oscillators will not cause any adverse effects on the reading and collection of data.

BRIEF DESCRIPTION OF THE DRAWINGS

FIG. 4 is a view used for the explanation of the mode of operation thereof;

FIG. 5 is a diagram of a sampling pulse generator in a data collection terminal;

FIG. 6 is a view used for the explanation of the mode of operation thereof;

FIG. 7 shows the waveforms of pulses generated in a remote terminal equipment and a data terminal;

FIG. 8 is a block diagram of a second embodiment of a data collection system in accordance with the present invention;

FIG. 13 is a clock diagram of the sampling pulse generator and the data reading circuit.

DESCRIPTION OF THE PREFERRED EMBODIMENTS

First Embodiment, FIGS. 1-7

Figure 1:
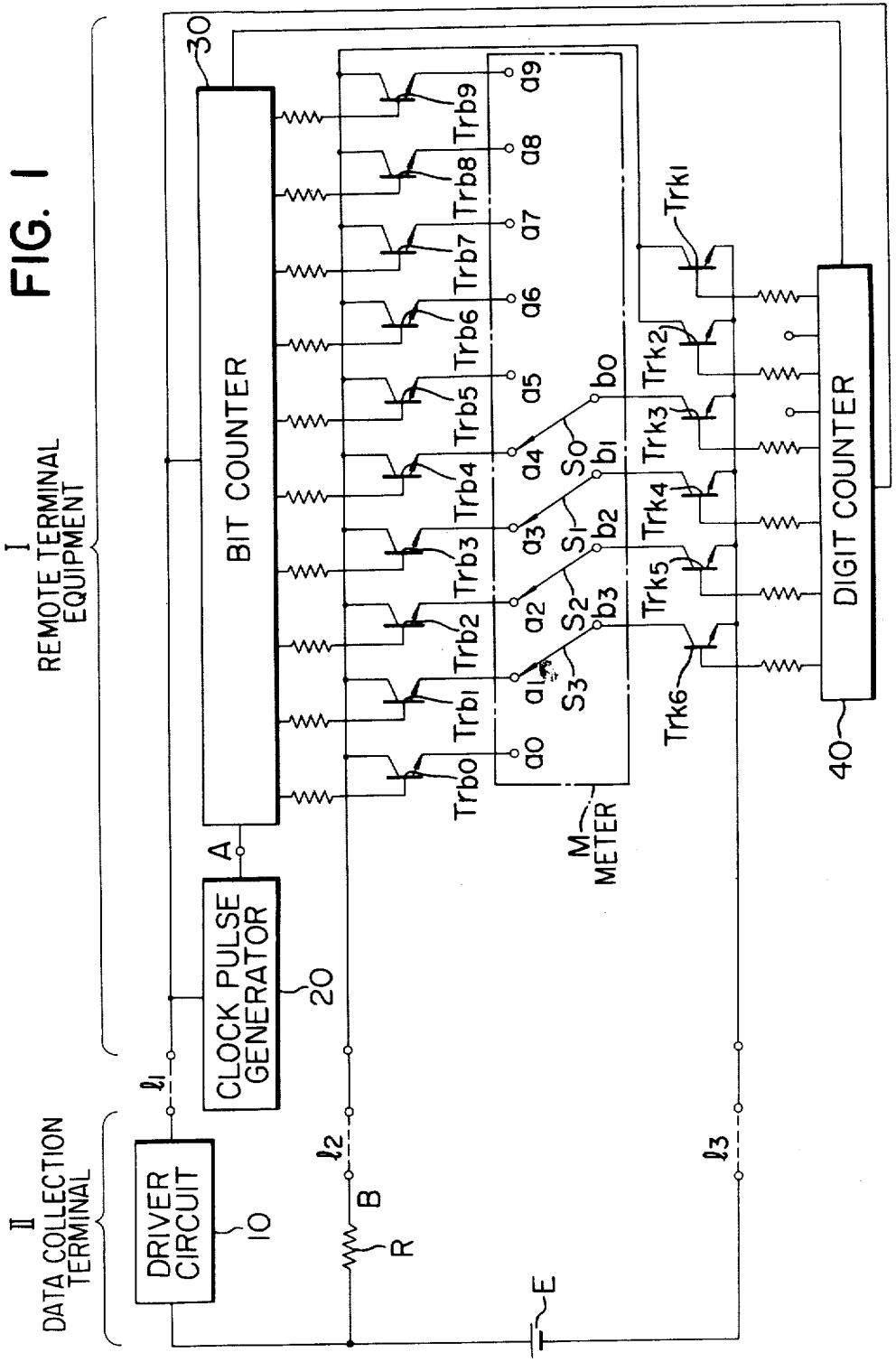
FIG. 1 is a block diagram of a first embodiment of a data collection system in accordance with the present invention.
Figure 2:
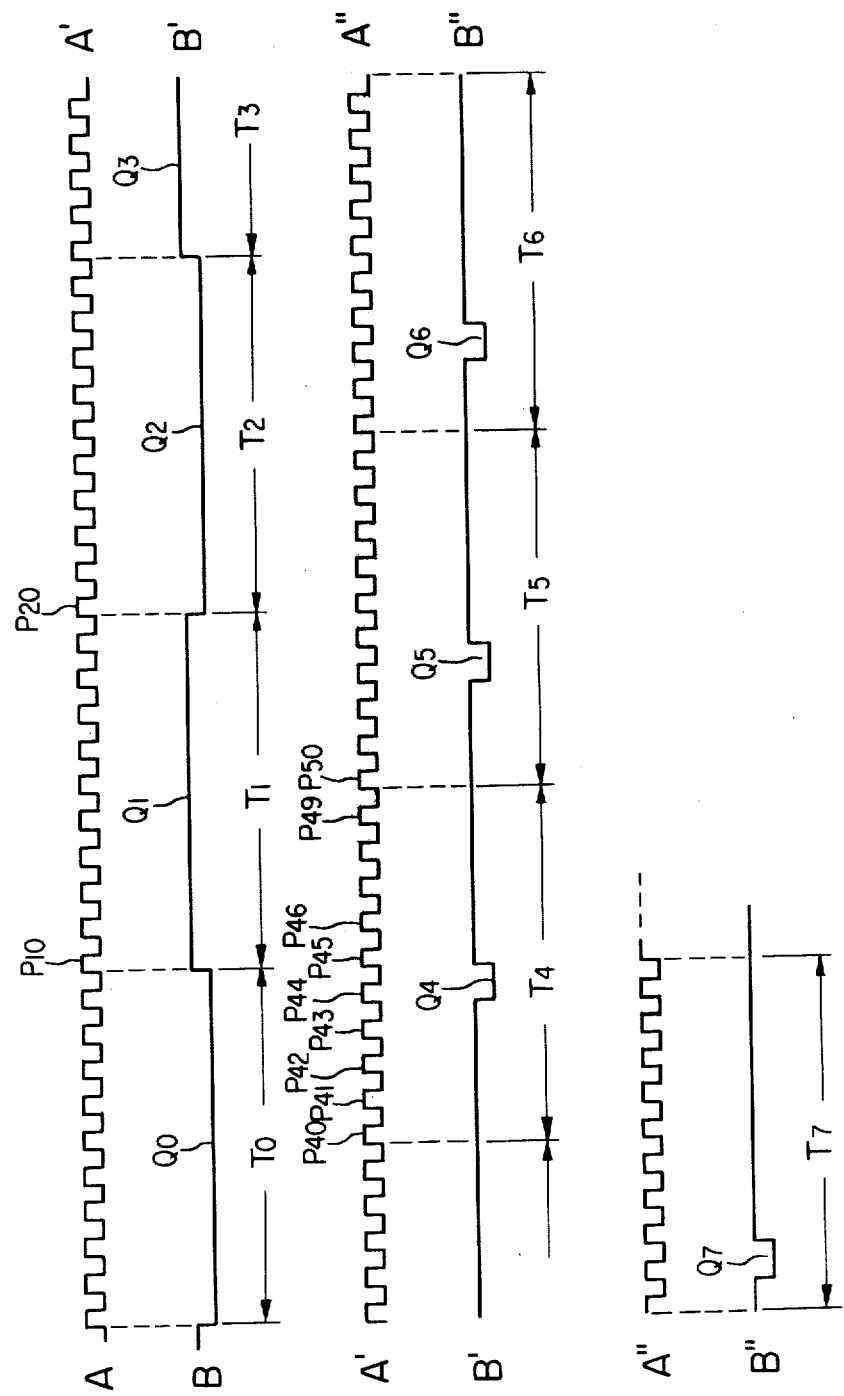
FIG. 2 shows waveforms of signals used for the explanation of the mode of operation of the first embodiment.

FIG. 1 is a view used for the explanation of a first embodiment of a data collection system in accordance with the present invention, and FIG. 2 shows the waveforms of main electrical signals generated in the data collection system shown in FIG. 1. In FIG. 1, I is a remote terminal equipment installed in each home for measuring the consumed quantity of electricity, water or gas. II is a data collection terminal for collecting data from a large number of remote terminal equipment. $l_1$, $l_2$ and $l_3$ are transmission lines interconnecting between the data collection terminal II and the remote terminal equipment I. $l_1$ is the transmission line for supplying the power to the remote terminal equipment I from the data collection terminal II; $l_2$, the data transmission line for transmitting the data from the remote terminal equipment I to the data collection terminal II; and $l_3$, the common transmission line.

When a driver circuit 10 in the data terminal II is activated to select the remote terminal equipment I, power is supplied to the remote terminal equipment I through the transmission lines $l_1$ and $l_2$. As a result, a clock pulse generator 20 is activated to generate the clock pulses which are fed to a bit counter 30. The output terminals of the bit counter 30 are connected through resistors to the bases of transistors $Trb_0$–$Trb_9$. As the clock pulses are applied to the bit counter 30, the base voltages of the transistors $Trb_0$–$Trb_9$ rise sequentially so that the transistors $Trb_0$–$Trb_9$ are enabled sequentially. When the bit counter 30 counts ten clock pulses from the clock pulse generator 20, it generates one output pulse in response to which a digit counter 40 is stepped or incremented by one. The output terminals of the digit counter 40 are connected through resistors, respectively, to the bases of transistors $Trk_1$–$Trk_6$ so that each transistor is enabled when it receives a high level signal from the digit counter 40. The remote terminal equipment I includes a meter (M) having a contact panel. $b_0$ is a contact of unit digits ($10^0$) or the least significant digit; $b_1$, a contact of tens digits ($10^1$); $b_2$, a contact of hundreds digits ($10^2$); and $b_3$, a contact of thousands digits ($10^3$).

When the remote terminal equipment I is selected and the source voltage supplied thereto rises to a predetermined level, the bit counter 30 and the digit counter 40 are set so that the transistors $Trb_0$ and $Trk_1$ are enabled and the current flows from a power source E, a resistor R, the transmission line $l_2$, the transistor $Trk_1$ and the transmission line $l_3$. Until the bit counter 30 counts ten clock pulses delivered from the clock pulse generator 20, the potential at the point B remains at a low level $Q_0$ (See FIGS. 2, A and B, during the time interval $T_0$). As the bit counter 30 counts ten clock pulses, the digit counter 40 increments by one so that the transistor $Trk_1$ is disabled. Since the second output terminal of the digit counter 40 is not connected to the transmission line $l_3$, no current flows through the transmission lines $l_2$ and $l_3$ so that the potential at the point B rises to and remains at a high level $Q_1$ (See FIG. 2, B, during the time interval $T_1$). When the bit counter 30 counts further ten clock pulses from the clock pulse generator 20, the digit counter 40 increments by one so that the transistor $Trk_2$ is enabled and consequently the potential at the point B drops to a low level $Q_2$ (See FIG. 2, B, during the time interval $T_2$). The data collection terminal II monitors the variations in potential at the point B so as to read the data from the remote terminal equipment I as will be described in more detail below.

After the data collection terminal II has been set to read the data, the bit counter 30 counts further ten clock pulses so that the contents in the digit counter 40 is incremented by one. However the fourth output terminal of the digit counter 40 is not connected to the transmission line $l_3$ so that no current flows and consequently the potential at the point B rises again to a high level $Q_2$ (See FIG. 2, B, during the time interval $T_3$). The high level signal $Q_2$ during the time interval $T_3$ is a synchronization signal. When the bit counter 30 receives the clock pulse $P_{40}$ after the sync signal has been obtained, the output signals appear at the first output terminal of the bit counter 30 and at the 4-th output terminal of the digit counter 40. In FIG. 1, the unit digit position contact $b_0$ is connected through a movable contact $S_0$ to the contact $a_4$, not to the zero contact $a_0$. As a result, no loop is established between the data collection terminal II and the remote terminal equipment I so that the potential at the point B remains at a high level $Q_3$. In like manner, in response to the pulses $P_{41}$ through $P_{43}$, the transmission lines $l_2$ and $l_3$ remain disconnected so that the potential at the point B remains at a high level $Q_3$. In response to the pulse $P_{44}$, the voltage at the fifth output terminal of the bit counter 30 rises to a high level so that the transistor $Trb_4$ is enabled. Since the transistor $Trk_3$, which is connected to the 4-th terminal of the digit 40, has been enabled, the transmission line $l_2$ is connected to the transmission line $l_3$ so that the current flows through them and consequently the potential at the point B drops (See FIG. 2, B', $Q_4$ during the time interval $T_4$). In response to the next clock pulse $P_{45}$, the bit counter 30 is stepped by one and the voltage at the 6-th output terminal rises to a high level while the voltage at the 5-th output terminal, which in turn is connected to the transistor $Trb_4$, drops to a low level so that the transistor $Trb_4$ is disabled. Since the five digit contact $a_5$, which in turn is connected to the emitter of the transistor $Trb_5$, is not connected to the unit digit position contact $b_0$, the transmission line $l_2$ is disconnected from the transmission line $l_3$ so that no current flows through them and consequently the potential at the point B rises again to a high level. In like manner, in response to the clock pulses $P_{46}$ through $P_{49}$, the transmission line $l_2$ remains disconnected from the transmission line $l_3$ so that the potential at the point B remains at a high level. Thus, during the first data reading or scanning interval $T_4$ for reading the least significant digit; that is, "4" in the unit digit position, the potential at the point B drops only once depending upon to which digit contact a is connected the unit digit position contact $b_0$. It follows therefore that the least significant digit; that is, "4" in the unit digit position may be detected by monitoring the voltage drop at the point B in the data collection terminal II. In like manner, the next least significant digit; that is, "3" at the tens digit position $10^1$ may be detected during the second data scanning interval $T_5$; the digit; that is, "2" in the hundreds digit position, during the third data scanning interval $T_6$; and the most significant digit; that is, "1" in the thousands digit position, during the fourth data scanning interval $T_7$. Thus, the data "1234", which is displayed by the meter M may be read out.

Figure 3:
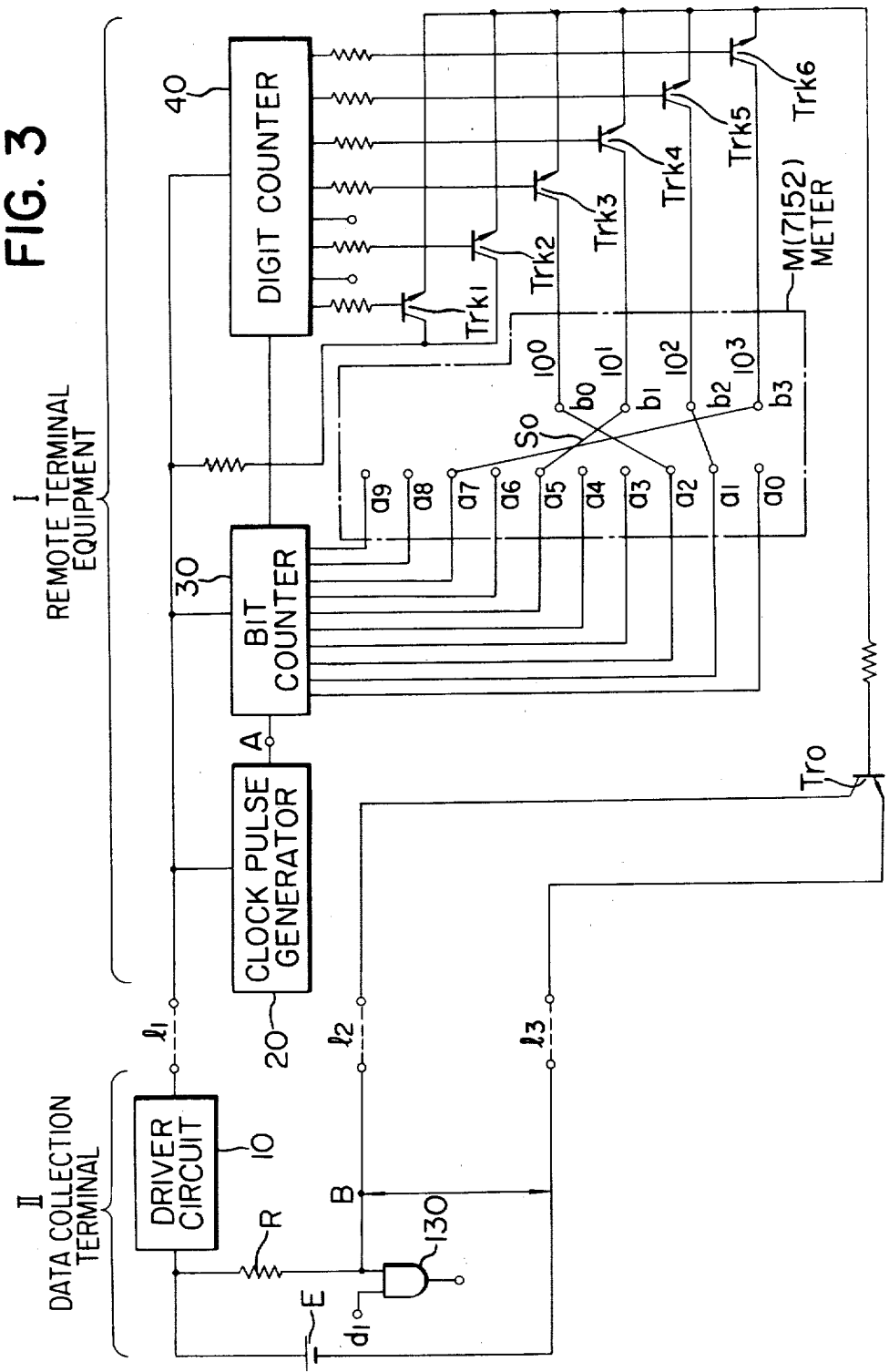
FIG. 3 is a block diagram of a modification of the first embodiment.

Modification, FIGS. 3 and 4

A modification of the first embodiment described above with reference to FIGS. 1 and 2 will be described with reference to FIGS. 3 and 4. As with the first embodiment, when the data collection terminal II selects the remote terminal equipment I, the power is supplied through the transmission lines $l_1$ and $l_3$ to the remote terminal equipment so that the bit counter 30 and the digit counter 40 are set and receive the clock pulses from the clock pulse generator 20 which is activated. The transistor $Trk_1$, which is connected to the first output terminal of the digit counter 40 is enabled so that a transistor $Tr_0$ is also enabled and consequently the transmission lines $l_2$ and $l_3$ are connected together. As a result, the current flows from the power source E through the resistor R, the transmission line $l_2$, the transistor $Tr_0$ and the transmission line $l_3$ back to the power source E so that the potential at the point B drops to a low level (See FIG. 4, $Q_0$). In response to the output signal from the bit counter 30, the contents of the digit counter 40 is incremented by one so that the voltage at the second output terminal rises to a high level. But this output terminal is not connected to any transistors $Trk_1$ through $Trk_6$ and the transistor $Trk_1$ is disabled so that the transistor $Tr_0$ is disabled and consequently the potential at the point B rises back to a high level (See FIG. 4,B, $Q_1$). When the contents in the digit counter 40 is incremented by one, the voltage at the third output terminal thereof rises to a high level so that the transistor $Trk_2$, which is connected to the third output terminal, is enabled and consequently the transistor $Tr_0$ is also enabled. As a result, the potential at the point B drops to a low level $Q_2$ (See FIG. 4,B). In response to the output signal from the bit counter 30, the contents in the digit counter 40 is further incremented by one so that the voltage at the fourth output terminal rises to a high level. But this output terminal is not connected to any transistors $Trk_1$ through $Trk_6$ and the transistor $Trk_2$ has been already disabled so that the transistor $Tr_0$ is disabled and consequently the potential at the point B rises to a high level $Q_3$. The high-level signal $Q_3$ at the point B is a sychronization signal as with the case of the first embodiment.

When the bit counter 30 receives the clock pulse $P_{40}$, the voltage at the first output terminal of the bit counter 30 rises to a high level and the 5-th output terminal of the digit counter 40 also rises to a high level and consequently the base voltage of the transistor $Trk_3$ rises to a high level. However the digit position contact $b_0(10^0)$ is connected to the digit "three" contact $a_3$, not to the digit "one" contact $a_1$ so that the transistor $Trk_3$ remains disabled and consequently the transistor $Tr_0$ remains disabled. As a result, the potential at the point B remains at a high level $Q_3$. In like manner, in response to the following clock pulses $P_{41}$ and $P_{42}$, the above state remains unchanged; that is, the potential at the point B remains at a high level. In response to the clock pulse $P_{43}$, the voltage at the third output terminal of the bit counter 30 rises to a high level. Since the third output terminal is connected to the digit "three" contact $a_3$ which in turn is connected through a movable contact $S_0$ to the unit digit position contact $b_0$ connected to the collector of the transistor $Trk_3$, the latter is enabled so that the transistor $Tr_0$ is also enabled and consequently the potential at the point B drops to a low level $Q_4$. When the bit counter 30 receives the next clock pulse $P_{44}$, the voltage at the third output terminal drops to a low level while the voltage at the fourth output terminal rises to a high level. Since the four digit contact $a_4$ is not connected to the unit position contact $b_0$ which in turn is connected to the transistor $Trk_3$, the latter is disabled so that the transistor $Tr_0$ is also disabled and consequently the voltage at the point B rises to a high level. In response to the succeeding clock pulses $P_{45}$ through $P_{49}$, the above state remains unchanged; that is, the potential at the point B remains at a high level. Thus, the potential at the point B drops only once during the first data scanning interval $T_4$ depending upon to which digit contact is connected the unit position contact $b_0$. That is, during the first data scanning interval $T_4$, the digit "2" in the unit digit position is read out. In like manner, the digit "5" in the tens digit position may be read out during the second data scanning interval $T_5$; the digit "1" in the hundreds digit position, during the interval $T_6$; and the digit "7" in the thousands digit position, during the interval $T_7$ as indicated by the voltage drops $Q_5$, $Q_6$ and $Q_7$, respectively, in FIG. 4,B. Thus the data "7152" displayed by the meter M may be read out into the data collection terminal II.

Sampling Pulse Generator, FIGS. 5 and 6

Next referring to FIGS. 5 and 6, a sampling pulse generator, which is installed in the data collection terminal II and generates the sampling pulses in synchronism with the clock pulses generated by the clock pulse generator 20 in the remote terminal equipment I, will be described. The sampling pulse generator includes an oscillator 50, AND gates 70, 120 and 130, a 1/10 frequency divider 80, counters 90 and 140, a latch circuit 100, a preset counter 110 and a display 150.

It is assumed that the pulse spacing of the clock pulses generated by the clock pulse generator 20 in the remote terminal equipment be $t_1$ while that of the pulses generated by the oscillator 50 be $t_2$ in the following discussion. During the sampling confirmation time interval $T_0$ (See also FIGS. 2 and 4), a high level input signal $C_1$ (See FIG. 6) is applied to an input terminal $C_1$ and the sampling confirmation signal $Q_0$ (low level) from the point B (See FIGS. 1 and 3) is applied to an input terminal B. During this sampling confirmation interval ($T_0 = 10\ t_1$), the output pulses from the oscillator 50 are fed through AND gate 70 to the frequency divider 80 so that the output signal therefrom has 1/10 the frequency of the input signal. The output pulses from the frequency divider 80 is counted by the counter circuit 90.

During the signal processing interval $T_2$, the input signal at the terminal $C_1$ is dropped to a low level and the contents in the counter 90 is latched while the control signal $C_3$ is applied to an input terminal $C_3$ so that the preset counter 110 may be set.

In response to the leading or positive edge of the synchronization signal $Q_3$, which lasts for the time interval $T_3$, a high-level input signal is applied to an input terminal $C_2$ so that the output pulses from the oscillator 50 may be delivered through AND gate 120 into the preset counter 110 which in turn generates one sampling pulse $d_1$ (See FIG. 6) every time when it receives a number of n output pulses from the oscillator 50 during a time interval equal to the pulse spacing $t_1$ of the clock pulses generated by the clock pulse generator 20. As a result, the pulse spacing of the output pulses $d_1$ from the preset counter 110 is exactly equal to that of the clock pulses A from the clock pulse generator 20 and is in precise synchronism therewith. In response to the output pulses $d_1$, AND gate 130 gates the output from the counter 90. Thus the timing when the potential at the point B drops to a low level $Q_4$, $Q_5$, $Q_6$ or $Q_7$ may be detected. Whenever the counter 140, which may be modulo-ten ring counter, receives the output from AND gate 130, its contents may be displayed by the display device 150.

However, with the arrangement described above, it cannot be ensured that the center of the sampling pulse $d_1$ exactly coincides with that of the clock pulse A so that errors in reading result.

In order to eliminate errors in reading, the clock pulses A generated by the clock pulse generator 20 in the remote terminal equipment I and the output pulses F from the oscillator 50 in the data collection terminal II must satisfy some requirements or conditions to be described below. First, as shown in FIG. 7, the deviation of the center of the clock pulse F from the center of the clock pulse A must be within ±25% of the pulse spacing $t_1$ of the clock pulse A. In case of the reading the data "7152" from the remote terminal equipment I shown in FIG. 3, a total of 50 sampling pulses are delivered during the synchronization interval $T_3$ and the first, second, third and fourth data scanning intervals $T_4$, $T_5$, $T_6$ and $T_7$ (See FIG. 4). Therefore in order that the accumulated deviation of the 50-th sampling pulse from the clock pulse A may be within the tolerance of ±25%, a tolerable deviation per clock pulse must be within ±0.5% = ±25% ÷ 50. As described elsewhere, the pulse spacing of the pulses delivered from the oscillator 20 is $t_1$ sec while that of the sampling pulses delivered from the oscillator 50 is $t_2$ sec. It is further assumed that the oscillator 50 deliver a number of N pulses during the data sampling confirmation interval $T_0 (= 10\,t_1)$. Then 10 $t_1 = N\, t_2$. During the same interval the frequency divider 80 delivers a number of n pulses which is equal to N/10. Hence $t_1 = n\, t_2$. Substituting $t_1 = n\, t_2$ into the sampling confirmation interval 10 $t_1$, we have 10 n $t_2$.

So far for the sake of simplicity, the data sampling confirmation interval $T_0$ has been assumed to be 10nt.

In practice, however, the real data sampling confirmation interval is $10nt + \alpha$, where $\alpha$ is an error. The error $\alpha$ may be further divided into $\alpha_1$ and $\alpha_2$ as follows:

$$-2t < \alpha_1 \leq 0 \quad (1)$$

because the least number of pulses delivered from the oscillator 50 and counted during the data sampling confirmation interval $T_0 = 10 t_1$ may become (N−2).

(2) The second error $\alpha_2$ is further divided into these depending upon round-off methods when n is obtained from N; that is, n = N/10.

$$-9t \leq \alpha_2 \leq 0 \quad (a)$$

when the least significant digit is deleted.

$$0 \leq \alpha_2 \leq 9t \quad (b)$$

when the least significant digit is deleted and one is added to the next higher significant digit.

$$-4t \leq \alpha_2 \leq 5t \quad (c)$$

when one is added to the next significant digit if the least significant digit is 5 or more, but no one is added to the next higher significant digit when the least significant digit is less than 4 inclusive.

When the second error (c) is selected, the total error $\alpha$ will become $$-6t < \alpha = \alpha_1 + \alpha_2 \leq 5t$$

An error per clock pulse is given by $$Q = \frac{\frac{10nt + \alpha}{10} - \frac{10nt}{10}}{\frac{10nt + \alpha}{10}} = \frac{\alpha}{10nt + \alpha}$$

In order that the rrror Q per clock pulse may be within 0.5% when $-6t < \alpha \leq 5t$, $$Q = \frac{6t}{10nt + 6t} = \frac{6}{10n + 6} \leq 0.005$$

Hence, n ≥ 120.

This means that when n is higher than 120, the above described relation in pulse spacing between the pulses delivered from the oscillator 50 and the coock pulses delivered from the clock pulse generator 20 in remote the terminal equipment I may be satisfied. However when the synchronization is made every time after each data scanning interval, the number of n may be higher than 48.

In summary, according to the present invention the sampling pulses are generated in the data collection terminal II in response to the clock pulses A delivered from the clock pulse generator 20 in the remote terminal equipment. Therefore the clock pulse generator 20 may be set to any suitable pulse-repetitive frequency. This means that the provision of a clock pulse generator with higher degree of accuracies may not be needed, no adjustment thereof may not be needed and the aging problem may be eliminated. As a result, the component parts of the remote terminal equipment may be advantageously selected from a wide variety of products so that the remote terminal equipment may be fabricated at low cost. Furthermore, when the pulse repetitive frequency of the oscillator 50 in the data collection terminal is selected higher than that of the clock pulse generator 20 in the remote terminal equipment I, the time deviation of sampling pulses may be minimized and consequently the accuracies in measurement and reading may be considerably improved.

Figure 9:
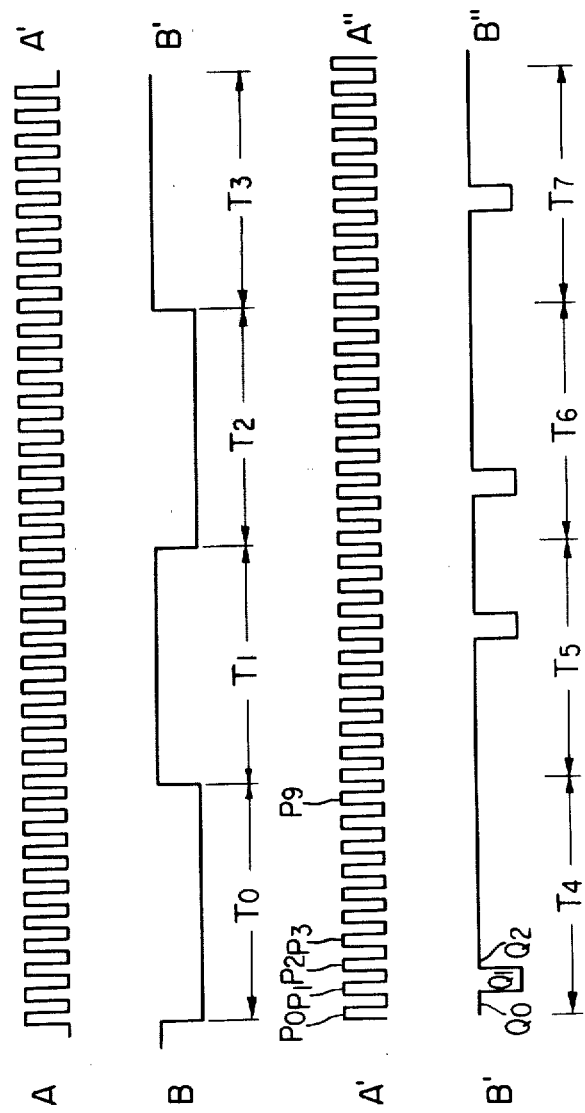
FIG. 9 is a view used for the explanation of the mode of operation thereof.
Figure 10:
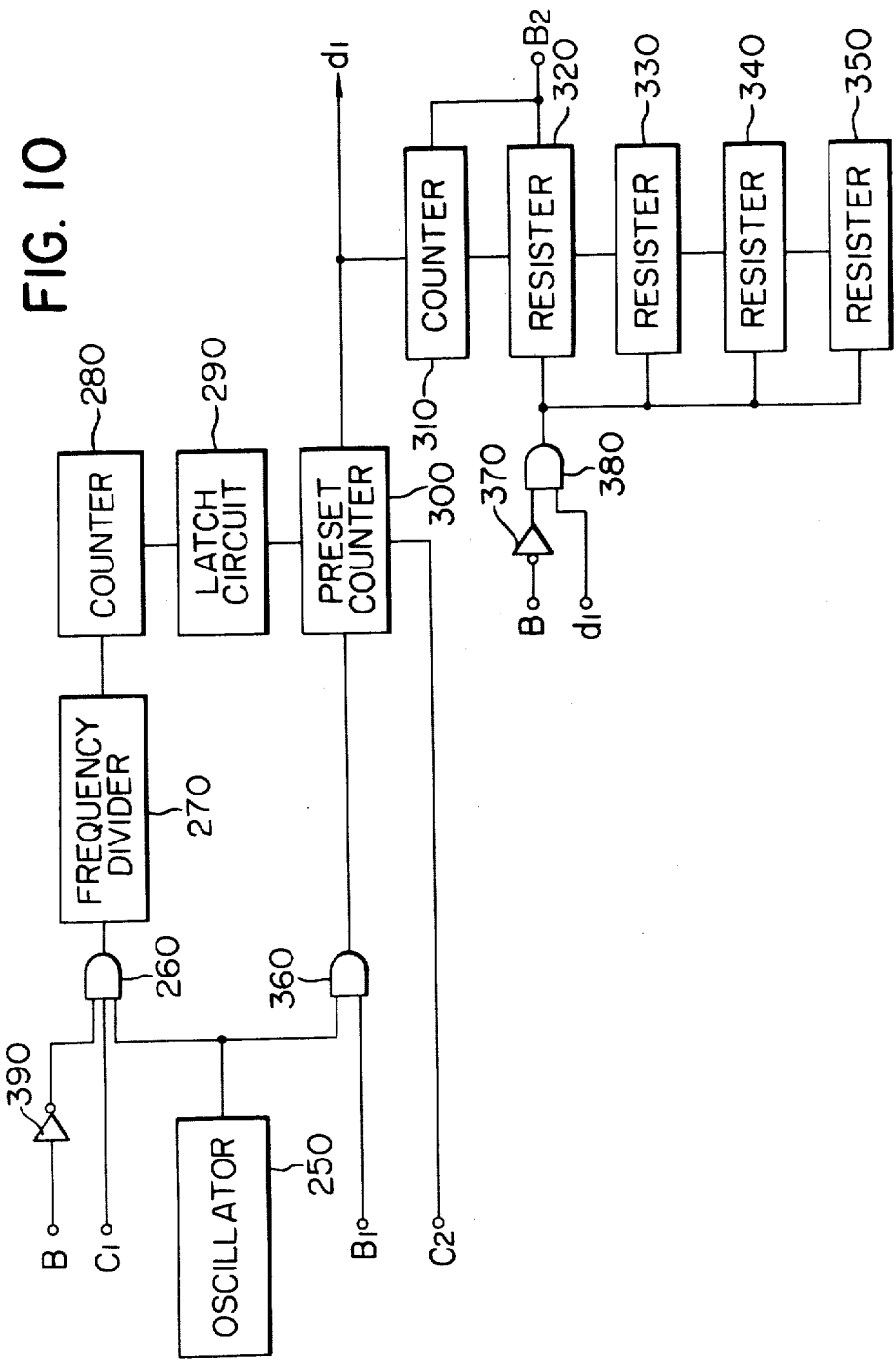
FIG. 10 is a block diagram of a data reading circuit in a data collection terminal.

Second Embodiment, FIGS. 8 through 10

A second embodiment of the present invention will be described with reference to FIGS. 8 and 9. As with the first embodiment, the reference numeral I denotes a remote terminal equipment which is installed in each home and includes a meter M for measuring the electricity, water or gas which has been consumed during a predetermined period. A large number of the remote terminal equipment I are connected to a data collection terminal II through two transmission lines $l_1$ and $l_2$ instead of three in the first embodiment.

The remote terminal equipment I has a clock pulse generator 220, a bit counter 230, a digit counter 240 and the meter M of the type described above.

A driver 210 in the data collection terminal II is activated to transmit the power through the transmission lines $l_1$ and $l_2$ to the selected remote terminal equipment I. Then the clock pulse generator 220 is activated to deliver the clock pulses (See FIG. 9,A) and the bit counter 230 and the digit counter 240 are set so that the transistor $Tr_1$, whose base is connected to a first output terminal of the digit counter 240, is enabled. As a result a transistor $Tr_0$, whose base is connected to the emitter of the transistor $Tr_1$, is also enabled so that the current flows from the power source E, a photocoupler PC, the driver 210, the transmission line $l_1$, a resistor R, the transistor $Tr_0$ and the transmission line $l_2$ back to the power source E. As a result, a photodiode $Dp_1$ in the photocoupler PC emits the light so that a phototransistor $Trp_1$ is enabled and consequently the potential at a point B connected to the collector of the phototransistor $Trp_1$ drops to a low level during a time interval $T_0$ (See FIG. 9,B).

When the bit counter 230 counts ten clock pulses A from the clock pulse generator 220, it delivers an output pulse to the digit counter 240 to increment the contents thereof by one. As a result, the voltage at the first output terminal of the digit counter 240 drops to a low level while the voltage at a second output terminal (second from the left) rises to a high level. As a result, the transistor $Tr_1$ is disabled and consequently the transistor $Tr_0$ is also disabled because the second output terminal is not connected to any transistors $Tr_1$ through $Tr_6$ whose emitters are connected to the base of the transistor $Tr_0$. The current flowing through the photodiode $Dp_1$ drops so that the phototransistor $Trp_1$ is disabled and consequently the potential at the point B rises again to a high level during a time interval $T_1$ as shown at B in FIG. 9. When the bit counter 230 further counts ten clock pulses, the contents of the digit counter 240 is incremented by one and the voltage at the second output terminal drops to a low level while the voltage at a third output terminal (third from the left), which is connected through a resistor to the base of the transistor $Tr_2$, rises to a high level. The transistor $Tr_2$ is then enabled so that the transistor $Tr_0$ is also enabled. Then the phototransistor $Trp_1$ is enabled again in a manner substantially similar to that described above so that the potential at the point B also drops to a low level as shown at B during a time interval $T_2$ in FIG. 9.

When the bit counter 130 counts further ten clock pulses A, the contents of the digit counter 240 is incremented again by one so that the voltage at the third output terminal drops to a low level while the voltage at a 4-th output terminal rises to a high level. As a consequence, the transistor $Tr_2$ is disabled and the transistor $Tr_0$ is also disabled because the fourth output terminal is not connected to the bases of any transistors $Tr_1$ through $Tr_6$. Then the phototransistor $Trp_1$ disabled so that the potential at the point B rises again to a high level as shown at B during a time interval $T_3$ in FIG. 9.

During the time intervals $T_0$ through $T_3$, the data collection terminal II counts the pulse repetitive frequency of the clock pulses delivered from the clock pulse generator 220 in the remote terminal equipment I. When the contents of the digit counter 240 is further incremented by one, the voltage at the 4-th output terminal drops to a low level while the voltage at a 5-th output terminal rises to a high level. The 5-th output terminal is connected to the base of the transistor $Tr_3$ whose collector is connected to a unit digit position contact $10^0$ and whose emitter is connected to the base of the transistor $Tr_0$. The unit digit position contact $10^0$ in turn is shown as being connected to the digit "1" contact 2 which in turn is connected to a second output terminal (second from the left) of the bit counter 230. When the bit counter 230 receives the clock pulse $P_0$ (See FIG. 9,A'), the voltage only at a first output terminal thereof which in turn is connected to the digit "0" contact 0, rises to a high level. As a result, in response to the clock pulse $P_0$, the transistor $Tr_3$ remains disabled so that the transistor $Tr_0$ remains disabled and consequently the potential at the point B remains at a high level $Q_0$ as shown at B' in FIG. 9.

In response to the next clock pulse $P_1$, the voltage at the first output terminal of the bit counter 230 drops to a low level while the voltage at the second output terminal, which in turn is connected to the digit "1" contact 1, rises to a high level. Since the digit "1" contact is connected through a movable contact to the unit digit position contact $10^0$ which in turn is connected to the collector of the transistor $Tr_3$, the latter is enabled so that the transistor $Tr_0$ is also enabled. As a result, the potential at the point B drops again to a low level $Q_1$ as shown at B in FIG. 9.

In response to the next clock pulse $P_2$, the voltage at the second output terminal and hence the digit "1" contact drops to a low level while the voltage at a third output terminal and hence at the digit "2" contact 2 rises to a high level. Since the digit "2" contact is not connected to the emitter of the transistor $Tr_3$, the latter is disabled and consequently the transistor Tr is also disabled so that the potential at the point B rises again to a high level $Q_2$ as shown at B' in FIG. 9.

In like manner, in response to the succeeding pulses from $P_3$ through $P_9$, the above state remains unchanged. That is, the potential at the point B remains at a high level. Thus the potential at the point B drops to a low level only once during the first data scanning interval $T_4$. A point in time at which the potential at the point B drops to a low level depends upon to which digit contact is connected the unit digit position contact $10^0$. Therefore, as with the first embodiment, the potential at the point B is always monitored so that the least significant digit; that is, "1" of the reading "4261" of the meter M may be read out based on the repetitive rate of the clock pulses A counted during the time intervals $T_0$ through $T_3$ as described above. The next higher digit "6" may be read out during a time interval $T_5$; the digit "2" in the hundreds digit position, during a time interval $T_6$; and the digit "4" in the thousands digit position or the most significant digit, during a time interval $T_7$.

Data Sampling Circuit, FIG. 10

Next referring to FIG. 10, a data sampling circuit in the data collection terminal II will be described in detail below. The data sampling circuit reproduces the sampling pulses based on the clock pulses A delivered from the clock pulse generator 220 so as to obtain the data from the remote terminal equipment I in the manner described above with reference to FIGS. 8 and 9. The data sampling circuit includes an oscillator 250, AND gates 260, 360 and 380, a 1/10 frequency divider 270, counters 280 and 310, a latch circuit 290, a preset counter 300, registers 320, 330, 340 and 350, and NOT gates 370 and 390.

Initially, a high-level input signal is kept impressed at an input terminal $C_1$. Then when a low level input signal B is applied to an input terminal B during the time interval $T_0$ which equals 10 pulse spacings of the clock pulses A, a high level output signal is delivered from NOT gate 390 to AND gate 260 to which is also applied the high-level signal impressed at the input terminal $C_1$. Therefore AND gate 260 passes the output pulses from the oscillator 250 to the frequency divider 270. The output pulses from the frequency divider 270 are counted by the counter 280.

During the next time interval $T_1$ during which the signal B rises to a high level, the voltage at the input signal $C_1$ is dropped to a low level so that AND gate 260 may be closed. Simultaneously, the contents n in the counter circuit 280 is latched in the latch circuit 290. Next a control signal is impressed at an input terminal $C_2$ so that the preset counter 300 may be set to n. Thereafter in response to an input signal impressed at an input terminal $B_2$, the counter 310 and the register 320 are reset; that is, their contents become zeros.

At the start of the time interval $T_3$ or the end of the time interval $T_2$, the input signal impressed at the input terminal $B_1$ rises to a high level so that AND gate 360 passes the output pulses from the oscillator 250 to the present counter 300. The preset counter 300 delivers one output pulse to the counter 310 every time when the counter 300 receives a number of n output pulses from the oscillator 250. Therefore the sampling pulses delivered from the presettable counter 300 are in exact coincidence and synchronism with the clock pulses A delivered from the oscillator 220 in the remote terminal equipment I.

The sampling pulses delivered from the counter 300 are counted by the counter 310. During the first data scanning interval $T_4$ (See FIG. 9), the voltage impressed at the input terminal B drops to a low level $Q_1$ (See also FIG. 9). The inverted signal or a high level signal is delivered from NOT gate 370 to AND gate 380 so that the latter passes the sampling pulse to the register 320 so that in synchronism with this sampling pulse the contents in the counter 310 is delivered to the first register 320. That is, the least significant digit "1" is read into the register 320. Simultaneously, the contents in the first register 320 is transferred into the second register 330 the contents of which is transferred into the third register 340 the contents of which is transferred into the fourth register 350.

In like manner, the next higher significant digit "6" is read into the first register 320 during the second data scanning interval $T_5$ (See FIG. 9); the digit "2" in the hundreds digit position, during the third data scanning time interval $T_6$; and the most significant digit "4", during the fourth data scanning interval $T_7$. Thus the digits "4", "2", "6" and "1" are stored in the registers 320, 330, 340 and 350, respectively.

In summary, according to the second embodiment of the present invention, only two transmission lines $l_1$ and $l_2$ are needed to interconnect between the data collection terminal II and each of the remote terminal equipment I so that the installation cost may be considerably reduced as compared with the first embodiment which requires three transmission lines. Each remote terminal equipment has its own clock pulse generator 220 and in response to the clock pulses A delivered therefrom the data collection terminal reproduces the sampling pulses which are in exact coincidence and synchronism with the clock pulse A so as to read out the data from the remote terminal equipment I in the manner described above. Therefore as with the first embodiment, the clock pulse generator 220 may not be have to be a precise oscillator which is very expensive. Furthermore the clock pulse generators 220 in respective remote terminal equipment I may oscillate at any suitable different frequencies because the sampling pulses in the data terminal are generated in response to the clock pulses delivered from respective clock pulse generators as described above. In addition, the aging of the clock pulse generators will not give rise to any problem. Moreover the component parts of the remote terminal equipment I may be advantageously selected from a wide variety of products so that the cost of the remote terminal equipment may be considerably reduced.

Figure 11:
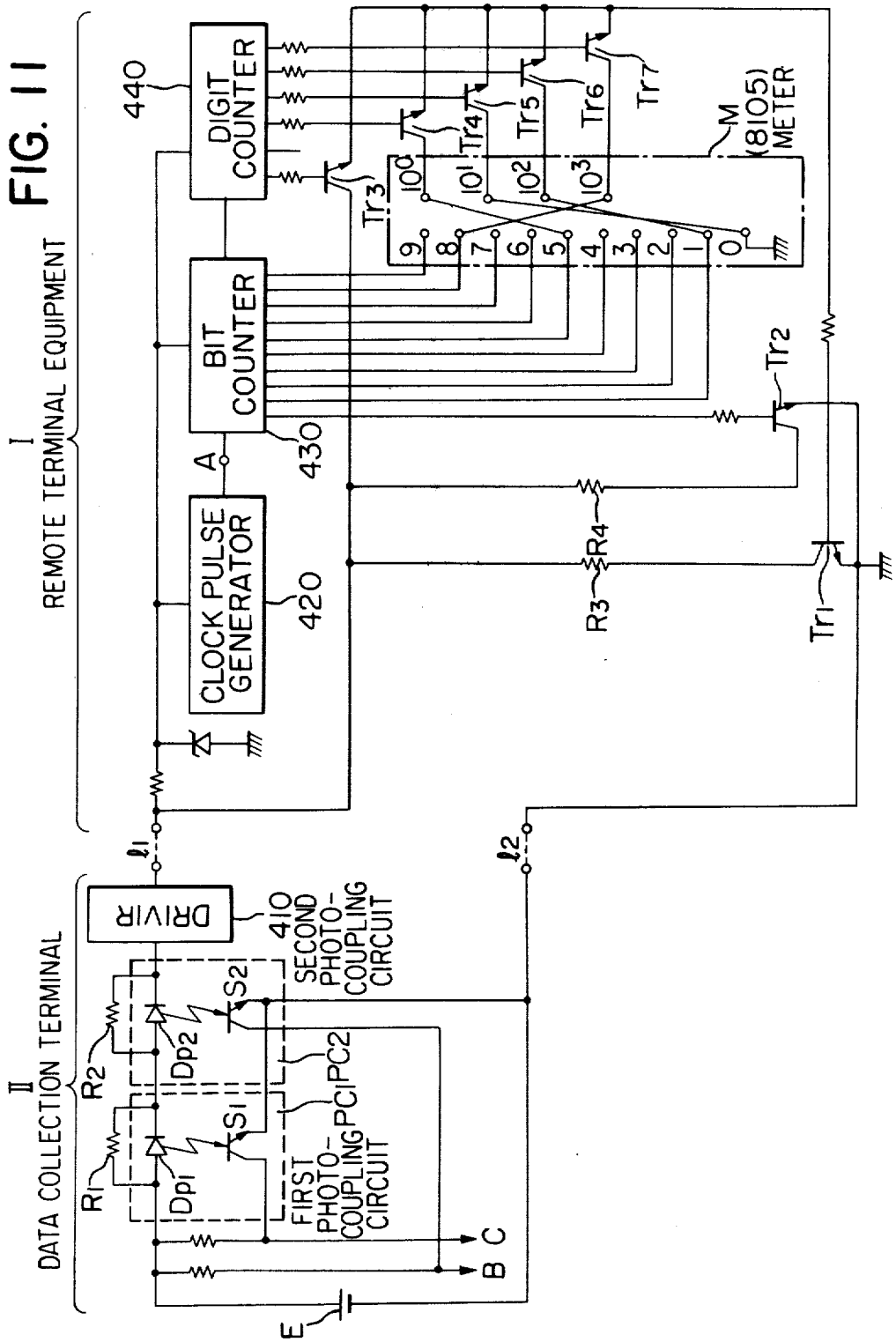
FIG. 11 is a block diagram of a third embodiment of a data collection system in accordance with the present invention.
Figure 12:
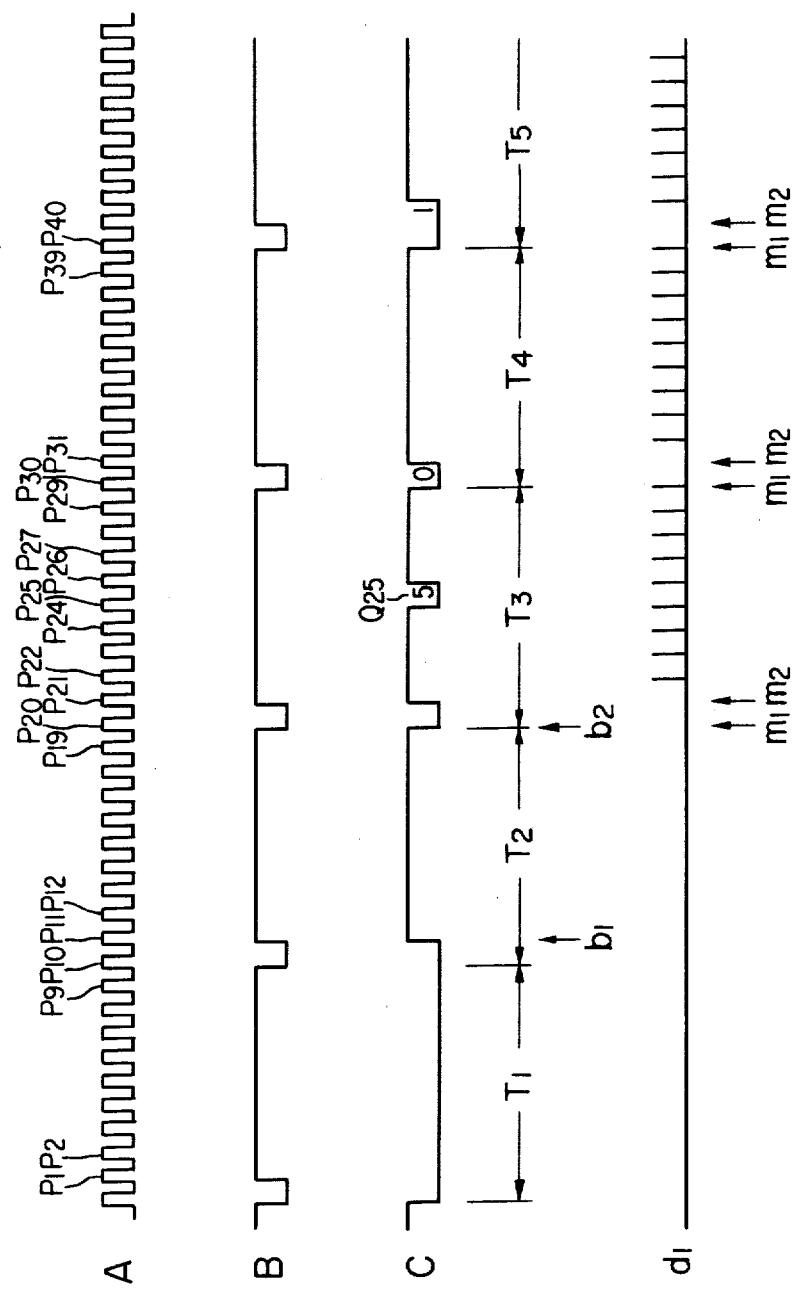
FIG. 12 is a view used for the explanation of the mode of operation of the third embodiment and a sampling pulse generator and a data reading circuit in a data collection terminal shown in FIG. 13.

Third Embodiment, FIGS. 11 through 13

Referring next to FIGS. 11 and 12, a third embodiment of the present invention will be described. Reference numeral I denotes a remote terminal equipment which is installed in each home and includes a meter for measuring electricity, water or gas consumed. A plurality of remote terminal equipment I are interconnected through two transmission lines $l_1$ and $l_2$ with a data collection terminal II. The remote terminal equipment I includes a clock pulse generator 420, a bit counter 430 and a digit counter 440.

When a driver 410 in the data collection terminal II is activated to select the remote terminal equipment I, the power is transmitted through the transmission lines $l_1$ and $l_2$ to the remote terminal equipment I so that the clock pulse generator 420 is activated and the bit counter 430 and the digit counter 440 are set. When the bit counter 430 is set, a transistor $Tr_2$ whose base is connected through a resistor to a first output terminal of the bit counter 430, is enabled. When the digit counter 440 is set, the voltage at a first output terminal thereof rises to a high level so that a transistor $Tr_3$, whose base is connected through a resistor to the first output terminal, is enabled so that a transistor $Tr_1$, whose base is connected to the emitters of transistors $Tr_3$ through $Tr_7$, is also enabled. As a result, the current flowing through a first and second photodiode $Dp_1$ and $Dp_2$ of a first and a second photo-coupling circuits PC1 and PC2 in the data collection terminal II increases so that a first phototransistor $S_1$ and a second phototransistor $S_2$ are enabled. As a result, potentials at points B and C drop to a low level as shown at B and C in FIG. 12.

In response to the clock pulse $P_1$ (See FIG. 12,A) from the clock pulse generator 420, the contents in the bit counter 430 is incremented by one so that the voltage at a second output terminal (second from the left in FIG. 11) rises to a high level while the voltage at the first output terminal drops to a low level. As a result, the transistor $Tr_2$ is disabled. The state of the digit counter 440 remains unchanged so that the transistor $Tr_3$ remains in the conduction state and consequently the transistor $Tr_1$ remains enabled.

The values of resistors $R_1$, $R_2$, $R_3$ and $R_4$ decrease in the order named; that is, $R_1 > R_2 > R_3 > R_4$. The value of the resistor $R_1$ is so selected that when the transistor $Tr_1$ is enabled, the current flowing through the first photodiode $Dp_1$ is sufficient enough to cause the phototransistor $S_1$ to be enabled. Then because of the relation $R_1 > R_2$, the second phototransistor $S_2$ will not be enabled. That is, when only the transistor $Tr_1$ is kept enabled while the transistor $Tr_2$ is disabled, the phototransistor $S_1$ remains enabled while the second phototransistor $S_2$ is disabled. As a result, the potential at the point B rises to a high level while the potential at the point C remains at a low level.

When the bit counter 430 receives the clock pulses $P_2$ through $P_9$, its contents is incremented and its second through 10-th output terminals sequentially rise to a high level once at a time. When the bit counter 430 receives the clock pulse $P_{10}$, its contents reverts to "0" so that the first output terminal rises again to a high level, enabling again the transistor $Tr_2$ and the contents of the digit counter 440 is incremented by one. As a result, a second output terminal (second from left in FIG. 11) of the digit counter 440 rises to a high level while the voltage at the first output terminal thereof drops to a low level so that the transistor $Tr_3$ is disabled. Since the second output terminal is not connected to the bases of any transistors $Tr_3$ through $Tr_7$, the transistor $Tr_1$ is disabled. Since $R_3 > R_4$, the current flowing through the transmission lines $l_1$ and $l_2$ when only the transistor $Tr_2$ is larger than when only the transistor $Tr_1$ is enabled. The value of the resistor $R_4$ is so selected that when only the transistor $Tr_2$ is enabled, the current flowing through the second photodiode $Dp_2$ is sufficient enough to cause the second phototransistor $S_2$ to be enabled. Therefore when the transistor $Tr_2$ is enabled while the transistor $Tr_1$ is disabled, both the phototransistors $S_1$ and $S_2$ are enabled so that the potential at the point B drops to a low level while the potential at the point C remains at a low level. Therefore the point in time at which the potential at the point B drops to a low level while the potential at the point C remains at a low level is timed with a point in time when the first output terminal of the bit counter 430 rises to a high level and may be used as a reference tine point.

When the bit counter 430 receives the next clock pulse $P_{11}$, the first output terminal drops to a low level so that the transistor $Tr_2$ is disabled but the second output terminal rises to a high level. Since the transistor $Tr_2$ is disabled, almost no current flows through the first and second photodiodes $Dp_1$ and $Dp_2$ so that both the first and second phototransistors $S_1$ and $S_2$ are disabled. As a result, the potentials both at the points B and C rise to a high level.

In response to the clock pulses $P_{12}$ through $P_{19}$, the above state remains unchanged; that is, the potentials at both the points B and C remain at a high level as shown at $T_2$ in FIG. 12.

In response to the clock pulse $P_{20}$, the contents of the digit counter 440 is incremented by one so that the third output terminal (third from the left in FIG. 12) rises to a high level. Since the third output terminal is connected through a resistor to the base of the transistor $Tr_4$, the base voltage thereof also rises to a high level. But in FIG. 11 the reading of the meter M is shown as "8105" so that the unit digit position contact $10^0$, which is connected to the collector of the transistor $Tr_4$, is connected to the digit "5" contact 5 which remains at a low level. As a result, no collector voltage is applied to the transistor $Tr_4$ so that the latter remains disabled and consequently the transistor $Tr_1$ remains disabled. Since the first output terminal of the bit counter 430 is at a high level, the transistor $Tr_2$ is enabled so that both the phototransistors $S_1$ and $S_2$ are enabled in the manner described elsewhere and consequently the potentials at both the points B and C drop to a low level.

When the bit counter 430 receives the next clock pulse $P_{21}$, the first output terminal thereof drops to a low level while the second output terminal rises to a high level so that the transistor $Tr_2$ is disabled. The transistor $Tr_1$ remains disabled. As a result, almost no current flow through the first and second photodiodes $Dp_1$ and $Dp_2$ so that both the phototransistors $S_1$ and $S_2$ are disabled and consequently the potentials at both the points B and C rise to a high level again.

In response to the succeeding clock pulses $P_{22}$ through $P_{24}$, the above state remains unchanged. That is, the potentials at both the points B and C remain at a high level.

When the bit counter 430 receives the clock pulse $P_{25}$, the 6-th output terminal thereof rises to a high level. Since the fifth output terminal is connected to the digit "5" contact which in turn is connected through a movable contact to the unit digit position contact $10^0$ which in turn is connected to the collector of the transistor $Tr_4$ as described elsewhere, the transistor $Tr_4$ is now enabled so that the transistor $Tr_1$ is also enabled. As a result, only the first phototransistor $S_1$ is enabled because of the reasons described elsewhere so that the potential at the point C drops to a low level as shown at $Q_{25}$ in FIG. 12 while the potential at the point B remains at a high level.

In response to the next clock pulse $P_{26}$, the 7-th output terminal of the bit counter 430 rises to a high level while the 6-th output terminal drops to a low level so that the transistor $Tr_4$ is disabled and consequently the transistor $Tr_1$ is also disabled. The transistor $Tr_2$ remains disabled. As a result, the potential at the point C rises again to a high level while the potential at the point B remains at a high level.

In response to the succeeding clock pulses $P_{27}$ through $P_{29}$, the above state remains unchanged. That is, the potential at both the points B and C remain at a high level. Thus during the first data scanning interval $T_3$, the least significant digit "5" is read out. In general, during the time interval $T_3$ for reading at least significant digit of the reading of the meter M, the potential at the point C drops to a low level only once depending upon to which digit contact is connected the unit digit position contact $10^0$. Therefore the least significant digit may be read out in terms of a point in time at which the potential at the point C drops to a low level.

In response to the clock pulse $P_{30}$, the first output terminal of the bit counter 430 rises to a high level so that the transistor $Tr_2$ is enabled. Simultaneously the fourth output terminal, which is connected through a resistor to the base of the transistor $Tr_5$, of the digit counter 440 rises to a high level. As a result, both the transistors $S_1$ and $S_2$ are enabled so that the potentials at both the points B and C drop to a low level.

In response to the succeeding clock pulses $P_{31}$ through $P_{39}$, the potentials at both the points B and C remain at a high level (See the time interval $T_4$ in FIG. 12) and the transistor $Tr_1$ remain disabled so that the phototransistor $S_1$ remains disabled. Therefore the next least significant digit of the reading of the meter M may be read out as "0" because during the second data scanning interval $T_4$ the phototransistor $S_1$ has not been enabled.

In like manner, the next most significant digit "1" of the reading of the meter M may be read out during the third data scanning interval $T_5$ and the most significant digit "8", in the fourth data scanning interval. Thus the reading "8105" of the meter M may be read out and collected at the data terminal II.

So far the bit counter 430 has been described as being a modulo-10 counter, but it will be understood that instead a modulo-11 counter may be used. In the latter case, the reference time point (that is, the time when both the potentials at the points B and C drop to a low level) may be differentiated from the time when the digit "0" is read out.

Referring finaly to FIG. 13 a circuit in the data collection terminal II for generating the sampling pulses based on the clock pulses delivered from the clock pulse generator 420 in the respective remote terminal equipment I so as to read the reading of the meter M will be described. It includes an oscillator 450, AND gates 460, 560, 570 and 600, a 1/9 frequency divider 470, counters 480 and 510, a latch circuit 490, a preset counter 500, registers 520, 530, 540 and 550, an OR gate 580, a NOT gate 590 and a timing pulse generator 700.

It is assumed that the pulse spacing of the clock pulses delivered from the clock pulse generator 420 in the remote terminal equipment I be $t_1$ and the pulse spacing of the clock pulses generated by the oscillator 450 to be $t_2$.

The output terminal B (See FIG. 11) of the second photocoupler PC2 is connected to an input terminal B so that the timing pulse generator 700 generates the first timing pulses which are synchronized with the trailing edges ($m_2$ in FIG. 12) of the negative going reference time pulses (See FIG. 12,B) and appear at the output terminal $B_1$ and the second timing pulses which are synchronized with the leading edges (See $m_1$ in FIG. 12) of the reference timing pulses B and appear at the output terminal $B_2$. The output terminal C (See FIG. 11) of the first photocoupler PC1 is connected to an input terminal C. A high-level signal is impressed on an input terminal $C_1$ from the time $b_1$ when the signal C rises to a high level to the time $b_2$ when the signal C drops to a low level during the time interval $T_2$ (See FIG. 12). Then AND gate 460 is opened for a time equal to nine pulse spacings of the clock pulses so that the output pulses from the oscillator 450 are delivered to the 1/9 frequency divider 470 through AND gate 460. The output pulses from the frequency divider 470 are counted by the counter 480 and at the time $b_2$ when the signal C rises to a high level the contents in the counter 480 is latched in the latch circuit 490. At the time $m_2$ when the reference timing pulse rises during the time interval $T_3$ (See FIG. 12), the first timing pulse is delivered from the first output terminal $B_1$ of the timing pulse generator 700 through OR gate 580 to the preset counter 500 so that the counter 500 is preset to the contents of the counter 480. Simultaneously, in response to the first timing signal, the counter 510 and the register 520 are reset; that is, their contents become zeros.

During the clock pulses $P_{21}$ through $P_{29}$, the input terminal B remains at a high level so that the output pulses from the oscillator 450 are delivered through AND gate 560 to the preset counter 500. Whenever the preset counter 500 receives a number of n output pulses from the oscillator 450 during the pulse spacing $t_1$ of the clock pulses delivered from the clock pulse generator 420 in the remote terminal equipment I, it generates one sampling pulse as shown at $d_1$ in FIG. 12. The sampling pulse $d_1$ is applied to one input terminal of AND gate 570 with two inputs so that the present counter 500 is reset again to the initial state; that is, n obtained by the 1/9 frequency divider 470. As a result, the pulse spacing of the sampling pulses $d_1$ delivered from the preset counter 500 is exactly equal to the clock pulses delivered from the clock pulse A generator 420 in the remote terminal equipment I and moreover the sampling pulses $d_1$ are in exact synchronism with the clock pulses A (See FIG. 12). The sampling pulses $d_1$ are counted by the counter 510.

In response to the clock pulse $P_{25}$, the potential at the output terminal C of the first photocoupler PC1 drops to a low level as described elsewhere and as shown at $Q_{25}$ in FIG. 12. This negative going digit data pulse $Q_{25}$ is inverted by the inverter 590 and applied to the AND gate 600. When the AND gate 600 receives the sampling pulse $d_1$, it delivers an output pulse in response to which the contents in the counter 510 is transferred into the first register 520. That is, the least significant digit "5" is read out and stored in the first register 520.

At the time $m_1$ when the reference timing signal B goes negative in response to the clock pulse $P_{30}$, the second timing pulse is delivered from the second output terminal of the timing pulse generator 700 to the second, third and fourth registers 530, 540 and 550 so that the contents in the first register 520 is transferred into the second register 530; the contents in the second register 530, into the third register; and the contents in the third register 540 into the fourth register 550.

In response to the clock pulse $P_{31}$, the input terminal B rises again to a high level so that the preset counter 500 is preset again and synchronized and the counter 510 and the first register 520 are reset in the manner described elsewhere. Thereafter the second data scanning for reading and collecting the next least significant digit of the reading of the meter M is started. Thus during the second data scanning time interval $T_4$, the next least significant digit is read out and stored; during the third data scanning interval $T_5$, the next most significant digit is read out and stored; and during the fourth scanning interval $T_6$ (not shown) the most significant digit is read out and stored. Therefore at the end of the fourth data scanning interval $T_6$, the least significant digit, the next least significant digit, the next most significant digit and the most significant digit are stored in the fourth, third, second and first registers 550, 540, 530 and 520, respectively. Thus the data collection is completed.

In the third embodiment described above with reference to FIG. 11, the bit counter is of a modulo-10 type and the reference timing signal is generated and transmitted when the contents of the bit counter 430 is zero. Therefore when the bit "0" contact is selected as shown in FIG. 11, no digit data signal is transmitted to the data collection terminal II as described elsewhere. Therefore whenever the digit "0" is read out, the zero contents is always transferred from the counter 510 to the first register 520, from the first register to the second register 530 and son on.

In summary, according to the third embodiment of the present invention, the reference timing pulse B, which is used for synchronizing the digit data reading timing and the digit data pulse C may be differentiated from each other in terms of the difference in magnitude or intensity of the current flowing through the transmission lines $l_1$ and $l_2$ so that they may be distinctly distinguished from each other in the data collection terminal II and consequently the correct reading of each digit may be ensured. Furthermore, in each data scanning interval, sampling is made only nine times and in response to the trailing edge of each reference timing clock B the preset counter 500 is preset again. That is, after each data scanning interval T, the data collection terminal II is resynchronized with the remote terminal equipment I. As a result, adverse effects due to the sampling time errors are negligible. Thus the present invention may provide a data collection system which may read the data from a remote terminal equipment with a higher degree of accuracy at a very fast speed yet in a highly reliable manner.

What is claimed is:

1. A remote meter reading arrangement, comprising:
  (a) a plurality of remote terminals each comprising:

a clock pulse generator for providing a periodic train of clock pulses;

a bit counter for sequentially and repetitively enabling a series of output lines in response to successive ones of said clock pulses;

a digit counter for sequentially enabling a group of output lines, said digit counter being incremented by one each time said bit counter completes a cycle enabling said series of output lines thereof;

a remote meter having a plurality of digit value contacts coupled to respective output lines of said bit counter, and a number of digit position contacts coupled to corresponding output lines of said digit counter, each digit position contact being connected by said meter to a digit value contact indicative of the value of the digit to be read at the corresponding digit position, whereby upon application of power to said remote terminal, each of said corresponding output lines of said digit counter is enabled for a time interval corresponding to the duration of said bit counter cycle, current flowing through said meter at a time from the beginning of each said time interval which is indicative of the value of the digit to be read at the corresponding digit position;

(b) a data collection terminal comprising:

driver circuit means for selectively supplying power to each of said remote terminals at a given time;

data signal generating means for providing a signal corresponding to the current flowing through said meter; and a sampling pulse generator coupled to said data signal generating means for providing sampling pulses having the same period as and in synchronism with said remote terminal clock pulses;

a data collection circuit coupled to said sampling pulse generator and said data signal generating means for providing an output signal indicative of the reading of said meter; and (c) transmission line means for connecting each of said remote terminals to said data collection terminal for providing power to said remote terminals and for coupling variations in current flow through said meter to said data signal generating means.

2. A remote meter reading arrangement as set forth in claim 1, wherein said transmission line means comprises a power supply line, a signal line and a common line.

3. A remote meter reading arrangement as set forth in claim 2, wherein power to said remote terminals and current variations indicative of said meter reading are coupled between said remote terminal and said data collection terminal by the same lines.

4. A remote meter reading arrangement as set forth in claim 1, wherein said sampling pulse generator comprises an oscillator capable of providing pulses at a frequency higher than that of said clock pulse generator in said remote terminal, during the time interval during which said clock pulse generator generates a predetermined number of clock pulses, frequency dividing means for dividing the number of pulses delivered by said oscillator by a number corresponding to said predetermined number of clock pulses, means for counting and storing a number corresponding to the output of said frequency dividing means, and preset counter means coupled to said counting and storing means and responsive to said oscillator pulses and a gating signal via a gating means for generating an output pulse every time the number of pulses delivered to said preset counter by said oscillator via said gating means reaches the counted and stored number.

5. A remote meter reading arrangement, comprising:

(a) a plurality of remote terminals each comprising:

a clock pulse generator for providing a train of pulses;

a meter having contacts interconnected in a manner indicative of the reading thereof;

a bit counter which is scanned by said clock pulses delivered from said clock pulse generator;

a digit counter which is incremented by one whenever said bit counter has counted a specified number of clock pulses;

current modulating means responsive to said clock pulses and to the logical product of an output bit of said bit counter, a position of a contact in each digit position of said meter and a bit position of said digit counter, for varying the current drawn by said remote terminal when power is supplied thereto;

(b) a data collection terminal for supplying power to said remote terminals and processing the variations in current drawn thereby to provide an output signal indicative of each corresponding meter reading, by determining the time current flows through said meter contacts after each corresponding time said digit counter is incremented, said data collection terminal including oscillator means for providing a periodic signal synchronous with said clock pulses; and (c) transmission line means for connecting each of said remote terminals to said data collection terminal.

* * * * *